Patented July 27, 1943

2,325,289

UNITED STATES PATENT OFFICE 2,325,289

PROCESS OF RECLAIMING RUBBER WASTE MATERIALS

Angiolo Treves, New York, N. Y., assignor, by mesne assignments, to Rubber & Plastics Compound Company, Inc., New York, N. Y., a corporation of New York No Drawing. Application January 21, 1941, Serial No. 375,291. In France May 9, 1940

1 Claim. (Cl. 260—717)

This invention relates to a method of reclaiming or regenerating rubber waste and to rubber compositions produced by the said method.

In the processes hitherto known high temperatures of sometimes as high as 200 to 270° C. are employed in order to obtain economical results. However, the thus obtained products have very poor mechanical properties due to partial molecular destruction caused by the high temperature.

Apart from the above specified drawbacks the high temperature processes create malodor in the reclaiming plants which greatly inconveniences the neighborhood. The products obtained by the high temperature processes are mechanically so inferior and particularly have such a low strength that rubber must be added to produce a practically usable composition.

However, in spite of the high temperature a uniform depolymerisation of the rubber waste is not obtained owing to the fact that the waste is collected from different sources and, therefore, materials of different composition are treated in the same batch.

Even motor car tires from the same manufacture and of the same grade subjected for an equal period to known reclaiming treatment show a different degree of depolymerisation. This difficulty is increased by the presence of plastifying substances and the varying degree of vulcanization of the material under treatment. Consequently at the end of the reclaiming process a comparatively small portion has been depolymerized to the proper degree which, therefore, possesses high mechanical properties, another portion has been depolymerized too far and has lost its strength and coherence and the remaining portion not having been sufficiently depolymerized hardly shows any sign of regeneration. This portion appears in the reclaimed product in the form of small lumps and makes it unsuitable for many applications.

In order to equalize the various degrees of depolymerisation and to remove the non depolymerized portions extensive and time-consuming refining processes are required. The non-polymerized portions must be collected at the circumference of the refining rolls and removed from the reclaimed portion. In many cases the percentage of the non depolymerized portion is as high as 25%.

The refining processes are very expensive due to the high costs of the machinery needed, due to high power consumption, due to high maintenance costs and low efficiency. Besides, the excessive friction exerted on the material by the treating machinery reduces the strength of the material.

It is the object of the invention to obviate the damaging effect of the hitherto known rubber waste reclaiming methods.

It is a further object of the same to convert the rubber waste within a surprisingly short period of approximately 30 minutes and at a surprisingly low temperature lying far beneath the melting point and lower than the vulcanization temperature of the rubber waste into a uniformly depolymerized material which may be easily vulcanised.

It may be another object of the invention to eliminate the hitherto customary expensive and time consuming refining processes.

It is a further important object of the invention to preserve the mechanical properties and particularly the original strength of the waste rubber at a much higher degree than this has been hitherto possible.

With these and other objects in view the ground rubber waste is intimately contacted with abietic acid or sylvic acid, or substances containing the same, in the absence of water or steam while maintaining a temperature of between 100 to 400° C.

The application of abietic acid, colophony and similar substances is known in the manufacture of waterproof insulating viscous rubber compositions. However, in the case of the known processes, rubber of any kind is heated with the said substances to high temperatures whereby the rubber is molten. In other words, it is a significant feature of the known processes to melt the rubber together with the colophony, or the fatty oils or bituminous substances, or hydrocarbons, or resins.

In full contradiction to these known processes the resins are used in the present case as a catalyst at a low temperature of approximately 100° C. to not more than 140° C. which temperature ranges below the melting point of any rubber material. The addition of abietic acid or sylvic acid may be controlled in such a manner that melting of the mixture is prevented.

Abietic acid may advantageously be added at a rate of approximately 1 to 5% of the rubber. It is a surprising result that when the resins are used within the range of these low temperatures the mechanical properties of the rubber molecules are fully preserved and that within a short period a uniformly depolymerized material is obtained which may be directly used without refining steps in admixture with or without rubber for all the purposes for which reclaimed rubber is employed.

It has also been suggested to reclaim mixtures of rubber waste and bitumen, pine oil and other softeners by heating the same to a temperature of about 150° C. However, in this case water is added producing steam at the treating temperature. Consequently, the working conditions are entirely different from those of the present method and therefore the known process has no bearing on the invention.

In the following an example is specified for carrying out the present method.

Waste automobile tires are ground in a suitable grinder to particle size of 12 to 15 mesh/sq. inch. The ground material is charged into a treating vessel provided with a mixing blade equipment. 3.5% by weight of the rubber contents of the charge of powdered abietic acid are added. The vessel is heated to about 130° C. and the mixing equipment is set into motion. The solid ground rubber waste particles are intimately contacted with the abietic acid. The treatment is maintained for a period of about 30 minutes.

The reclaimed material is removed from the treating vessel. It is in a condition to be used immediately; it may be added directly to a rubber batch without being subjected to a refining treatment.

In the present process due to the short duration and the low treating temperature cooling may be eliminated while in the hitherto customary reclaiming methods such cooling is essential and in some cases requires a time which may last longer than the reclaiming process.

This constitutes a further important advantage of the invention. Moreover, owing to the short duration and to the low temperature white or slightly colored rubber waste materials do not lose their original color.

Due to the low treating temperature no malodor is produced and the plant which requires a small area even for a considerable production may be erected at any place. No autoclaves, no electric equipment and no high pressure steam generators are required as used in many existing plants.

I claim:

A process for reclaiming rubber waste comprising treating a mixture consisting substantially of the ground rubber waste and about 1–5% of a substance selected from the group consisting of abietic acid and sylvic acid in the absence of water or steam for a period of approximately 30 minutes while maintaining a temperature of between 100 to 140° C.

ANGIOLO TREVES.